Oct. 23, 1934.
A. KUHNS
1,978,209
COUPLING FOR ROTATABLE ELEMENTS
Filed Oct. 27, 1933  2 Sheets-Sheet 1
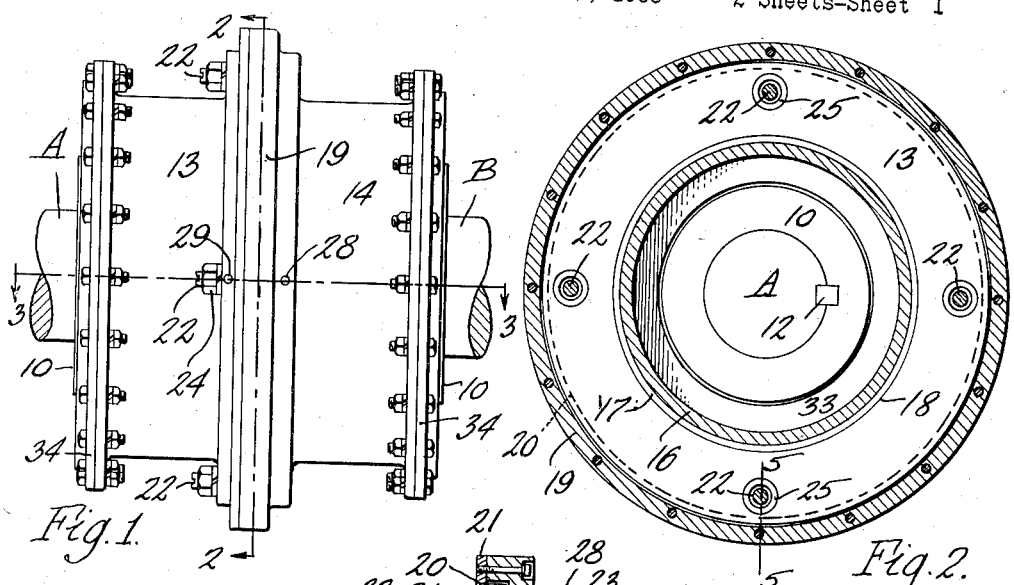
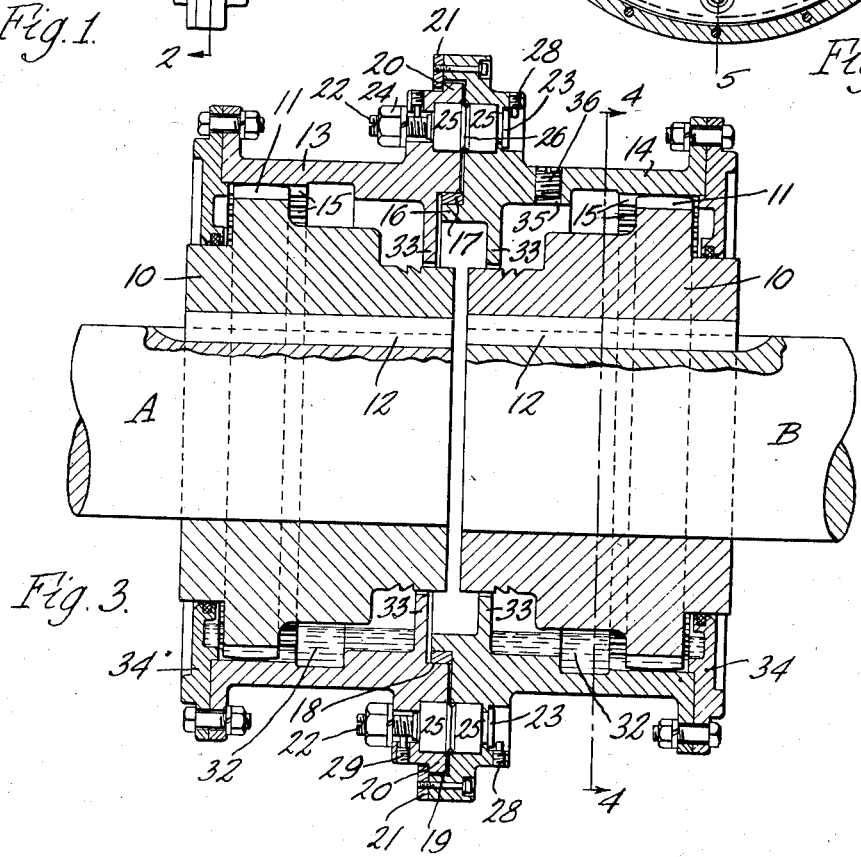
INVENTOR.
Austin Kuhns
by Parker, Crowhow & Farmer
ATTORNEYS.

Oct. 23, 1934.  A. KUHNS  1,978,209
COUPLING FOR ROTATABLE ELEMENTS
Filed Oct. 27, 1933  2 Sheets-Sheet 2
Fig. 4.
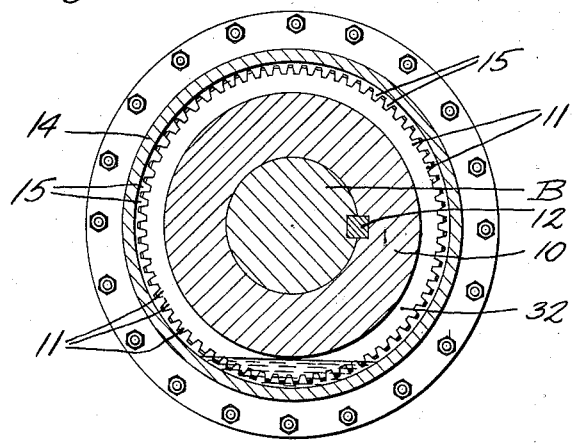
Fig. 5.
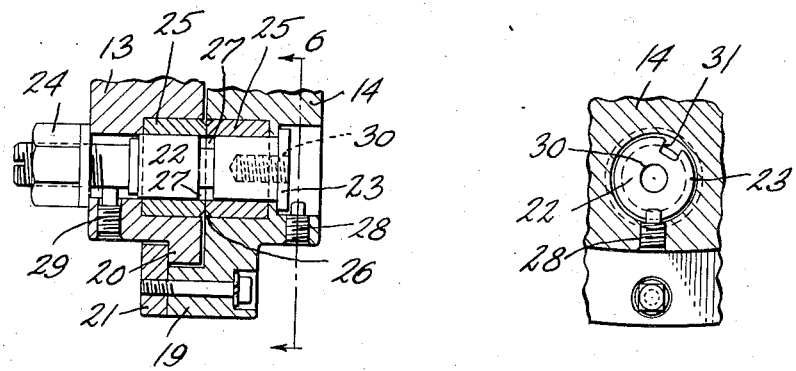
Fig. 6.
INVENTOR.
Austin Kuhns
by Parker, Grochow & Harmer
ATTORNEYS.

Patented Oct. 23, 1934

1,978,209

UNITED STATES PATENT OFFICE 1,978,209

COUPLING FOR ROTATABLE ELEMENTS

Austin Kuhns, Buffalo, N. Y., assignor to Farrel-Birmingham Company, Inc., Buffalo, N. Y.

Application October 27, 1933, Serial No. 695,461

8 Claims. (Cl. 64—91)

This invention relates more particularly to improvements in that type of flexible couplings for rotatable shafts or elements in which a coupling sleeve is employed provided with teeth or parts which intermesh or engage with complementary teeth or parts on the rotatable elements for causing one element to rotate positively with the other, while nevertheless the formation of said teeth or parts permit the limited relative movement between the sleeve and the coupled elements necessary to accommodate limited misalinement or misadjustment of said elements. A common construction of such couplings comprises heads or annular enlargements on the adjacent ends of the shafts provided with peripheral teeth which intermesh with complementary teeth formed in the opposite ends of the coupling sleeve which surrounds the two shaft enlargements, the peripheral edges of the teeth on the shaft enlargements being longitudinally crowned or convexed to enable limited rocking movement of the shafts relatively to the coupling sleeve. The coupling sleeve is divided between its ends or composed of annular sections or halves which are bolted or otherwise secured together to form a rigid sleeve but are separable to facilitate the assembling of the parts and the alinement or adjustment of the shafts or elements which are coupled by the sleeve. Such couplings are ordinarily formed so as to provide an enclosed reservoir or chamber for oil for lubricating the intermeshing teeth or parts of the coupling.

One object of this invention is to provide a coupling of this type of improved construction in which the oil for lubricating the interengaging teeth or parts between each rotatable element and the related sleeve section is confined in a separate oil chamber and is prevented from reaching the joint between the separable sleeve sections, thereby avoiding the necessity for employing a packed or oil-tight joint between the separable sections of the sleeve and, if desired, permitting the sleeve sections to be joined so as to allow limited relative movement thereof.

Other objects of the invention are to provide an improved construction in which the sections of the coupling sleeve are connected by shear pins or elements adapted to shear or break under the excessive load or strain to permit independent relative rotation of said sleeve sections which, however, are then held from axial separation and are provided with a bearing on which one section may revolve relatively to the other section; also to permit such relative movement or play between the sleeve sections without the loss of the lubricant from the sleeve; and also to provide a flexible coupling of the type mentioned which has the other features of improvement and advantage hereinafter described and set forth in the claims.

In the accompanying drawings:

Fig. 1 is a side elevation of a flexible coupling embodying my invention.

Fig. 2 is a transverse section thereof on line 2—2, Fig. 1.

Fig. 3 is a longitudinal, sectional elevation thereof on an enlarged scale on line 3—3, Fig. 1.

Fig. 4 is a transverse section of the coupling in the plane of line 4—4, Fig. 3.

Fig. 5 is a fragmentary, longitudinal, sectional elevation, on an enlarged scale, on line 5—5, Fig. 2, showing one of the shear pins and associated parts.

Fig. 6 is a transverse section on line 6—6, Fig. 5.

In the construction illustrated in the drawings as a practical embodiment of my invention, A and B represent the adjacent ends of two shafts each having an annular head or enlargement 10 rigid therewith which is formed with a circular series of peripheral teeth 11. As shown, the shaft enlargements 10 are separate pieces rigidly secured on the shafts to turn therewith by keys 12. The gear teeth 11 are formed on the peripheries of annular flanges or enlarged portions of the heads 10 and the outer peripheral edges of the teeth are crowned or convexed longitudinally.

The two shafts are coupled together by a coupling sleeve made in two annular halves or sections 13 and 14 which are rigidly secured together at their adjacent or inner ends, and each sleeve section is provided adjacent its outer end with a circular series of internal teeth 15 which are complementary to and mesh with the teeth 11 on the related shaft head 10. The sleeve sections being thus rigidly connected to each other and having intermeshing toothed connections with the shaft heads, cause one shaft to rotate with the other, but the crowning or convexing together with backlash of the teeth 11 on the shaft heads permits limited misalinement or relative movement of the shafts.

One of the sleeve sections, as 14, is provided at its inner end with an annular end flange 16 surrounded by a bushing 17 of bronze or other suitable anti-friction material, and the other sleeve section is recessed at its inner end to receive said flange and bushing 17 and provide an internal, annular shoulder 18 adapted to bear and turn on the bushing 17. These parts form a spigot joint between the sleeve sections. The bearing bushing and shoulder 18 are retained in bearing engagement with each other by suitable means which prevent axial separation of the sleeve sections but permit relative rotation of the sections. For this purpose, for example, one sleeve section, as 14, is provided at its inner end with a peripheral end flange 19 which surrounds a circumferential flange 20 on the other sleeve section and is retained in connection therewith by a keeper ring 21 secured, as by bolts, to the flange 19 and overlapping the flange 20 on the sleeve sections 13. The sleeve sections are thus held from axial separation while nevertheless one sleeve is capable of rotation relatively to the other.

For connecting the sleeve sections rigidly or so as to turn together, shear pins or bolts 22 are shown which extend longitudinally through alined holes in the circumferentially enlarged or flanged inner ends of the sleeve sections. Any suitable number of these shear pins or bolts may be provided, four being shown in the drawings, spaced equidistantly around the sleeve.

As best shown in Figs. 5 and 6, each shear pin or bolt is provided at one end with a head 23 which engages the bottom of the counterbore of the bolt hole in the sleeve section 14 and is secured by a nut 24 screwed on the threaded, opposite end of the bolt. By tightening these nuts, the two sleeve sections are drawn toward each other and rigidly secured together. The alined holes in the sleeve sections for the shear pins 22 are counterbored from their adjacent ends to receive hardened steel bushings 25, and the shear pin extends through and fits snugly in the alined bushings 25 in the two sleeve sections. The two bushings for each pin abut end to end, and the abutting ends of the bushings are preferably bevelled at their outer corners, as shown at 26. The shear pin is grooved annularly at 27 in the plane of the abutting ends of the two bushings 25 so that the pin is transversely weakened at this point and adapted to break when subjected to a strain or load in excess of a predetermined maximum. The grooving or weakening of the shear pins in the plane of the abutting ends of the bushings insures that when the pins are subjected to a shearing load, they will shear at the weakened points in the plane of the abutting ends of the bushings and not at some other point in their length. Therefore, in the event of the shearing of the pins, which would permit one sleeve section to rotate relatively to the other, the hardened steel bushings will prevent the fractured ends of the shear pins from scoring or injuring any part of the sleeve sections except possibly the bushings themselves, so that in the event of the shearing of the pins and the freeing of the sleeve sections for relative rotation, only the shear pins and the bushings can be damaged, and these parts can be replaced at much less expense than would be required to replace or repair the body of an injured sleeve section. This result is further insured by having the bushings 25 project slightly beyond the end face of the sleeve section in which they are located and bevelling their outer corners at 26.

In order to retain the parts of a broken shear pin in place and prevent them from dislodgment from their holes or protruding from the bushings, a stop 28 secured to the sleeve section 14 projects into the shear pin hole at the outer end of the head of the pin, and a stop screw or stud 29 secured to the other sleeve section engages the reduced opposite end of the shear pin. These stops are preferably formed by screw studs screwed into threaded holes in the sleeve sections. If the shear pin breaks, the studs 28 and 29 will prevent the escape or protrusion of the parts of the pin from the pin holes or bushings either inwardly or outwardly, and the parts of the shear pin can only be removed by first withdrawing the stops. Preferably, in order to facilitate the removal of the head-end of a broken shear pin, the head-end is provided with a screw threaded axial hole 30 into which a threaded tool can be screwed to connect it to the broken shear pin. The projecting circumferential flange of the shear pin head may be notched as indicated at 31, Fig. 6, so that when the tool has been screwed into the head portion of the shear pin for removing it, the head portion can be turned until the notch 31 registers with the stop 28, whereupon the head portion can be pulled out of its hole.

The external diameters of the shaft heads 10 and the internal diameters of the coupling sleeve sections inwardly beyond the teeth 11, 15, are of such dimensions as to leave an annular space between each head and the surrounding sleeve section, and this space forms a chamber or reservoir 32 for oil for lubricating the intermeshing teeth. Each sleeve section is provided at its inner end portion or at the inner end of this chamber 32 with an internal, annular flange or wall 33 which projects inwardly, close to the opposed reduced portion of the shaft head. A separate oil chamber is thus formed in each sleeve section between the flange 33 and the usual cover or oil retaining ring 34 at the outer end of the sleeve section. Oil is introduced into these oil chambers or reservoirs through suitable openings provided for the purpose in the sleeve sections, one such filling opening being shown at 35, Fig. 3, closed by a screw plug 36. The quantity of oil introduced into each oil chamber is such that when the coupling is at rest, the oil will not rise to the height of the flange 33 at the lower side of the coupling, and when the coupling revolves, the body of oil in each chamber will be held by centrifugal force in an annular layer against the outer wall of the sleeve section between the flange 33 and the oil retaining cover 34. Thus, the oil is prevented by the flange 33 from flowing over said flange to the joint between the connected inner ends of the sleeve sections whether the coupling is at rest or is revolving, and oil is prevented from escaping through the joint between the sleeve sections without packing the joint or making the joint of oil-tight formation.

By the described construction, springs or resilient bushings or elements of rubber or other resilient material can be used to connect the coupling sleeve sections either for the purpose of providing torsional resiliency between the sections or to insulate the sections electrically from each other, since the separate oil chambers obviate the necessity for a rigid or oil-tight joint between the sleeve sections.

I claim as my invention:

1. A coupling comprising two rotatable elements, a coupling sleeve surrounding said elements and comprising two annular sections joined together end to end, and interengaging parts on said sleeve and each rotatable element for transmitting rotary motion from one element to the other, each sleeve section and the adjacent rotatable element forming between them an annular oil chamber communicating with the interengaging parts of said section and element, and each sleeve section having an inwardly extending annular wall disposed between said oil chamber and the joint between said sleeve sections, the only lane of communication for the passage of oil from said oil chamber to said joint being over the inner portion of said annular wall, and said wall extending toward the axis of rotation of the coupling sufficiently to prevent escape of oil from said oil chamber to said joint.

2. A coupling comprising two rotatable elements, a coupling sleeve surrounding said elements and comprising two annular sections joined together end to end, interengaging parts on said sleeve and each rotatable element for transmitting rotary motion from one element to the other, said sleeve forming separate annular oil chambers each surrounding one of said rotatable elements and communicating with the interengaging parts of the sleeve and said element, and said sleeve sections having inwardly extending annular walls disposed between said oil chambers and the joint between said sleeve sections, the only lane of communication for the passage of oil from said oil chambers to said joint being over the inner portions of said annular wall, and said walls extending toward the axis of rotation of the coupling sufficiently to prevent escape of oil from said oil chambers to said joint.

3. A coupling comprising two rotatable elements, a coupling sleeve surrounding said elements and comprising two annular sections joined together end to end, each rotatable element and the surrounding sleeve section forming an intervening annular oil chamber and having intermeshing teeth located in said oil chamber for causing said sleeve section to rotate with said element, and an annular wall which extends from said sleeve section at the inner end of said oil chamber inwardly toward the axis of rotation of the coupling far enough to prevent flow of oil from said oil chamber to the joint between said sleeve sections, the only lane of communication for the passage of oil from said oil chamber to the joint between said sleeve sections being over the inner portion of said annular wall.

4. A coupling comprising two rotatable elements, a coupling sleeve surrounding said elements and consisting of two annular sections rigidly connected end to end, said sleeve and elements having interengaging parts for transmitting rotary motion from one element to the other, and said sleeve sections being joined by a spigot joint formed by overlapping integral annular portions of said sleeve sections which provide a bearing on which one section can rotate relatively to the other in case the rigid connection between said sections breaks, and means for preventing endwise separation of said sleeve sections when said rigid connection breaks.

5. A coupling comprising two rotatable elements, a coupling sleeve surrounding said elements and comprising two annular sections arranged end to end with a spigot joint between said ends formed by overlapping integral annular portions of said sleeve sections, and a shear pin rigidly connecting said sleeve sections, said sleeve and elements having interengaging parts for transmitting rotary motion from one element to the other, said spigot joint providing a bearing on which one sleeve section can rotate relatively to the other in case said shear pin breaks, and means for preventing endwise separation of said sleeve sections when said rigid connection breaks.

6. A coupling comprising two rotatable elements, a coupling sleeve surrounding said elements and comprising two single-piece annular sections arranged end to end with a spigot joint between said ends formed by overlapping integral annular portions of said sleeve sections, shear pins, rigidly connecting said sleeve sections, said sleeve and elements having respectively integral teeth which intermesh for transmitting rotary motion from one element to the other, said spigot joint providing a bearing on which one sleeve section can rotate relatively to the other in case said shear pins break, and means for preventing axial separation of said sleeve sections when said shear pin breaks.

7. A coupling comprising two rotatable elements, a coupling sleeve surrounding said elements and comprising two annular sections arranged end to end with a spigot joint between said ends formed by an integral annular shoulder on one section entering a circular recess in the other section, a shear pin rigidly connecting said sleeve sections, said sleeve and elements having respectively integral parts which intermesh for transmitting rotary motion from one element to the other, said spigot joint providing a bearing on which one sleeve section can rotate relatively to the other in case said shear pin breaks, and a hardened bearing bushing in each sleeve section for said shear pin.

8. A coupling comprising two rotatable elements, a coupling sleeve surrounding said elements and comprising annular sections arranged end to end, shear pins which rigidly join said sleeve sections end to end and are adapted to shear under abnormal load, said sleeve and rotatable elements having interengaging parts for transmitting rotary motion from one element to the other, said sleeve forming with each rotatable element a separate oil chamber in which the interengaging parts between said element and the sleeve are located, and annular walls which extend from said sleeve sections between said oil chambers and the joint between said sleeve sections inwardly toward the axis of rotation of the coupling sufficiently to prevent the flow of oil from said oil chambers to said joint.

AUSTIN KUHNS.